June 9, 1936.    W. M. BACON, JR    2,043,918
STARTING BOX FOR RACING ANIMALS
Filed March 23, 1933    2 Sheets-Sheet 1

Willard M. Bacon, Jr.
INVENTOR
BY Victor J. Evans & Co.
ATTORNEY

June 9, 1936. W. M. BACON, JR 2,043,918
STARTING BOX FOR RACING ANIMALS
Filed March 23, 1933 2 Sheets-Sheet 2

Willard M. Bacon, Jr.
INVENTOR
BY Victor J. Evans & Co.
ATTORNEY

Patented June 9, 1936

2,043,918

UNITED STATES PATENT OFFICE 2,043,918

STARTING BOX FOR RACING ANIMALS

Willard M. Bacon, Jr., Tampa, Fla., assignor to J. Homer Ellis, Hillsborough County, Fla., and E. J. O'Hare, Dade County, Fla.

Application March 23, 1933, Serial No. 662,339

1 Claim. (Cl. 119—15.5)

The invention relates to a starting apparatus for racing purposes and more particularly to starting boxes for racing animals.

The primary object of the invention is the provision of a box of this character, wherein the series of starting doors for the freeing of the animals within the starting box are controlled simultaneously so that they will open with uniformity and with great speed and at the same time the working of these doors will be practically noiseless so as not to distract the animals especially at the starting point in racing events, the box in its entirety being of novel construction.

Another object of the invention is the provision of a box of this character, wherein the doors for the separate animal compartments in the box are controllable through mechanism which will assure absolute accuracy for the opening of the doors to free the animals to a racing course, the opening of these doors being uniform throughout the series thereof and such mechanism permits of both the closing of the doors after the starting of the animals in the race and the latching through the instrumentality of a single latching device of the doors in their closed position.

A further object of the invention is the provision of a box of this character which is comparatively simple in its construction, thoroughly reliable and efficient in its operation, the working parts being exposed for free access thereto, the opening of the doors of the boxes for starting animals in a race being effected uniformly and with dispatch and the box in its entirety being susceptible of manufacture at a minimum expense.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:

Figure 6 is an enlarged, fragmentary, vertical, detailed, sectional view taken on the line 6—6 of Figure 1, looking in the direction of the arrows.

Similar reference characters indicate corresponding parts throughout the several views in the drawings.

Figure 1:
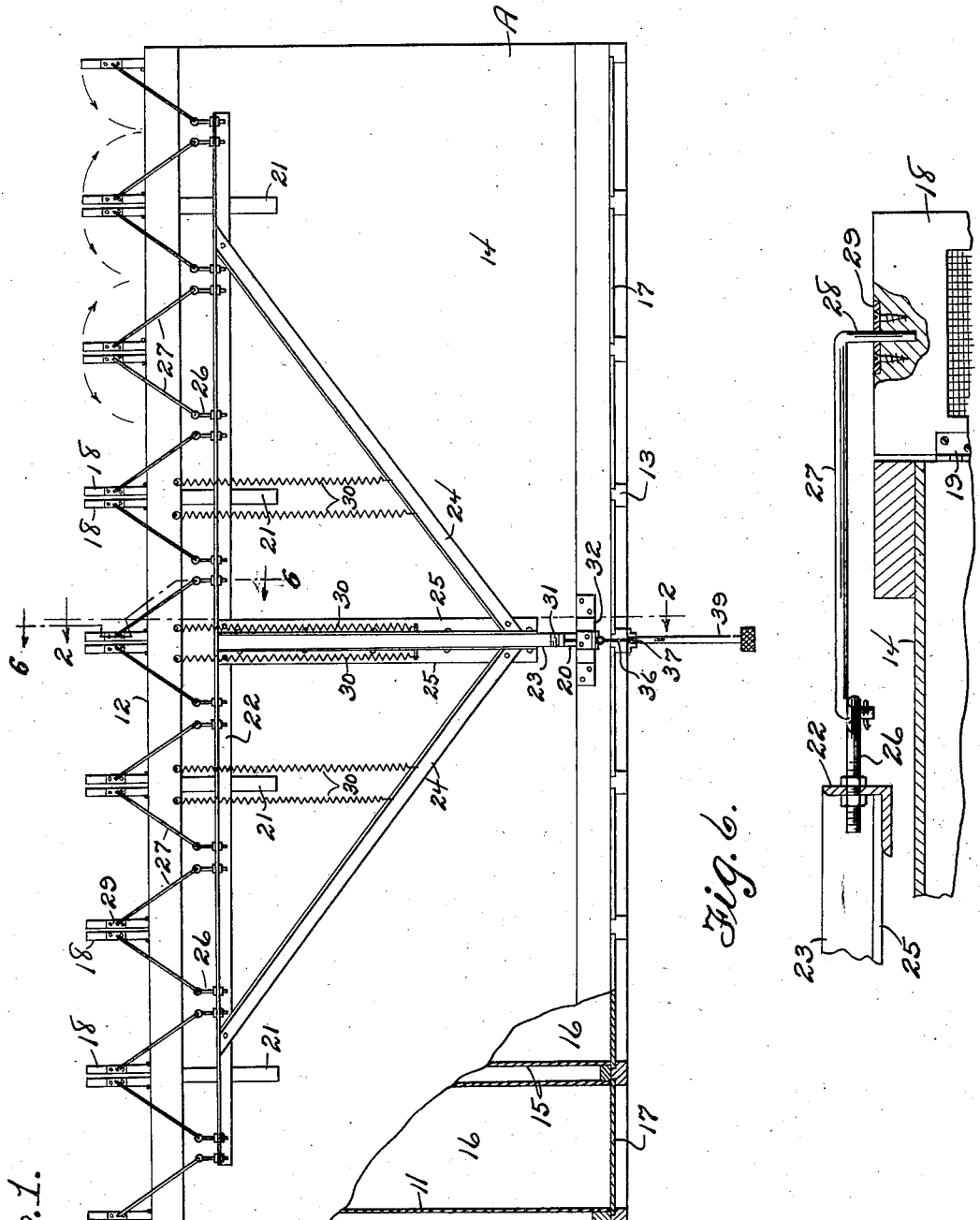
Figure 1 is a top plan view of a starting box constructed in accordance with the invention, a portion thereof being broken away at its top for illustrating interior organization.

Referring to the drawings in detail, the starting box for racing animals constituting the present invention comprises a comparatively light casing A including a bottom 10, ends 11, front 12, back 13 and top 14, respectively. Within this casing A are arranged suitable equidistanced vertical partitions 15 to provide a series of animal stalls or compartments 16 which open through the front and back of the casing. Into these stalls or compartments are received the racing animals. The open back to each stall or compartment is closed by a vertically slidable door or gate 17 which is mountable in the back framing of the casing A in any desirable manner. At these open backs of the compartments or stalls 16 the racing animals are admitted into the casing or starting box.

Arranged for horizontal swinging movement at the open fronts to the stalls or compartments 16 are double starting doors 18 which upon opening allow the freedom of the racing animals for racing purposes. It is preferable that these doors be swingingly supported upon hinges 19. When the doors 18 are in closed position this is a barrier for the freeing of the racing dogs within the starting box.

Arranged upon the top 14 of the casing A transversely thereof at its center is a guide rail 20, while at proper distances removed inwardly from the ends 11 of the casing A parallel with said rail 20 are bearings 21 upon which is movably supported the coupling rail 22 of a door opening plunger frame 23 having the diagonally disposed braces 24 joined with said rail 22 to effect a rigid structure. The plunger frame at the center bar thereof carries on opposie sides substantially L-shaped angle members 25, these being overlapped with respect to the guide rail 20 and guiding the plunger frame in its movement.

Adjustably mounted in the rail 22 are eye bolts 26, these being properly positioned and having pivoted therein links 27, each including a hook terminal 28 to engage in a keeper 29 countersunk in the upper edge of each door 18. The hook 28 engaged with the keeper 29 pivotally connects the link 27 with its door. It will be seen that when the plunger frame 23 is advanced under the action of the links 27 the doors 18 will be caused to swing to open position and by reason of the slidable fitting of such plunger frame upon the guide rail 20 these doors under their opening movements will be uniform and simultaneously opened.

Suitably attached to the top 14 close to the front of the casing A is a series of evenly distributed coiled retractile springs 30, these being also connected in their arrangement with the braces 24 of the plunger frame and the tensioning of these springs is such as to render the advance of the plunger for the simultaneous opening of the doors with great speed.

The center rail of the plunger frame at its rearmost end is formed with a latching notch 31 and this end plays through a bridge 32 upon which is mounted a spring tensioned latching device 33 which is adapted to engage the notch 31 when the plunger frame is retracted against the resistance of the springs 30 so that the doors 18 will be locked closed as these doors in the retracting movement of the plunger frame swing to closing position.

In this instance there is shown an electric solenoid 34 having a movable armature or core 35, this being connected with the latching device 33 and on energizing the solenoid the said latching device 33 can be moved to releasing position for the freeing of the plunger frame. Of course it is to be understood that the control of the latching device for the releasing thereof can be effected either automatically or manually, the solenoid 34 being merely disclosed for the purpose of illustrating a method of control of this latching device.

Figure 2:
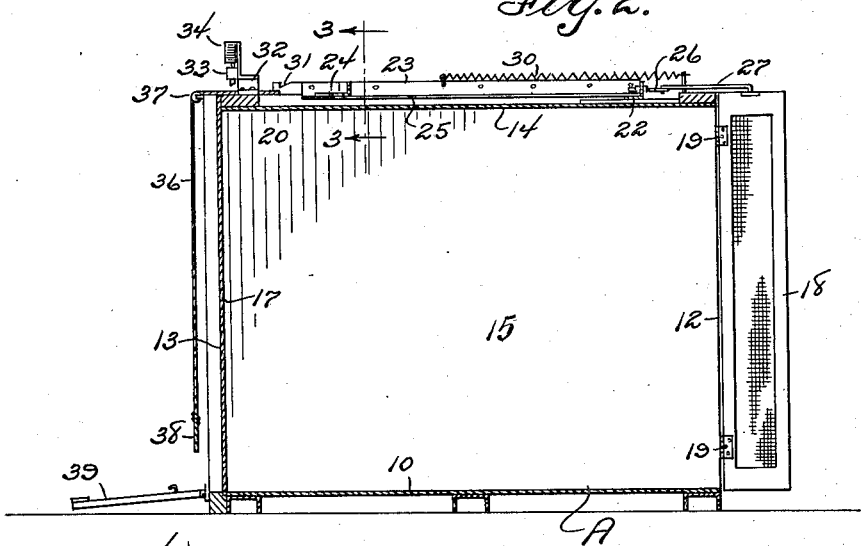
Figure 2 is a vertical transverse sectional view on the line 2—2 of Figure 1 looking in the direction of the arrows.
Figure 3:
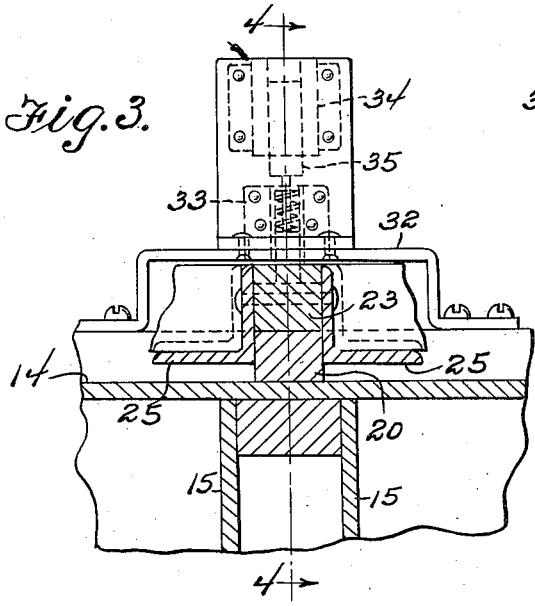
Figure 3 is an enlarged fragmentary detail sectional view on the line 3—3 of Figure 2 looking in the direction of the arrows.
Figure 4:
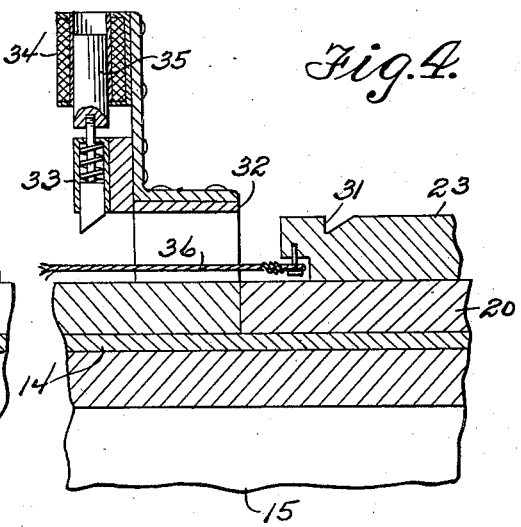
Figure 4 is a sectional view on the line 4—4 of Figure 3 looking in the direction of the arrows.
Figure 5:
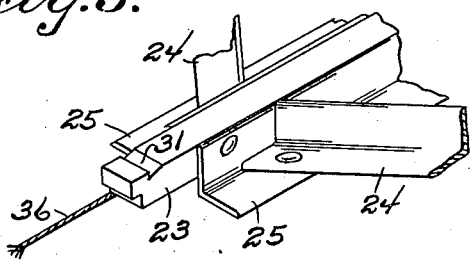
Figure 5 is a fragmentary perspective view of the latching end of the plunger frame for the door operating mechanism.

Connected with the notched end of the plunger frame is a pull cable 36 trained over a suitable guide pulley 37 located properly at the back of the casing A and this cable is provided with a coupling end 38 for detachable connection with a foot pedal 39 which is depressibly supported at the back of the casing A and through this pedal, under foot operation, the plunger frame can be more readily retracted to assume a latched position under the tension of the springs 30. When this has been done it is preferable to separate the cable from the pedal 29 at its coupling end 38. The details of the pull cable 36, the pedal 39 and the coupling end 38 of such cable are clearly shown in Figure 2 of the drawings and their operation for the purposes named will be clearly apparent.

In the use of the starting box the casing A devoid of racing animals is placed at the starting point of an animal race course. Then the doors or gates 17 are raised and the racing animals enter their respective compartments or stalls 16, it being understood of course that the starting doors 18 normally are closed. In this position of the doors the plunger frame is latched. Now when it is desired that the animals be freed from the box the latching device is controlled to free the plunger frame 23. With maximum speed, under the tension of the springs 30, the starting doors 18 will be simultaneously opened one with respect to the other, whereupon the racing animals can make an exit for starting in a race from the starting box. It must be borne in mind that a simultaneous opening movement to the starting doors 18 is effected without any possible irregularity in the opening of such doors and the opening is executed practically noiseless.

It should be obvious that the working parts can be readily lubricated to minimize friction and noise.

What is claimed is:

In a structure of the character described having doorways arranged in the same plane and side by side, double swinging doors normally closing the doorways, a guide arranged above the doorways, a coupling rail movable upon the guide, a plunger frame secured to the coupling rail and including a center bar superimposed on the guide, and angle pieces on the bar and overlapping the guide, a plurality of springs distributed along the frame for urging the coupling rail in one direction, eye bolts adjustably carried by the coupling rail, links pivoted to the doors and in the eyes of said bolts for the swinging of such doors to open or closed positions, and means for latching the frame against movement when the doors are closed.

WILLARD M. BACON, Jr.